United States Patent [19]

Nelson

[11] 4,344,459
[45] Aug. 17, 1982

[54] FLOW CONTROL DEVICE EMPLOYING ELASTOMERIC ELEMENT

[76] Inventor: Walter R. Nelson, 7914 Grand Ave., Yucca Valley, Calif. 92284

[21] Appl. No.: 203,456

[22] Filed: Nov. 3, 1980

[51] Int. Cl.³ ............................................. F15D 1/02
[52] U.S. Cl. ..................................... 138/45; 138/41; 138/43; 138/46; 239/533.14
[58] Field of Search ............... 137/504, 498, 517; 138/43, 45, 46; 239/533.13, 533.14

[56] References Cited

U.S. PATENT DOCUMENTS

| | | | |
|---|---|---|---|
| 2,851,060 | 9/1958 | Fleischer et al. | 138/46 |
| 2,878,836 | 3/1959 | Binks | 138/45 |
| 2,948,296 | 8/1960 | Thorburn | 138/43 X |
| 3,326,242 | 6/1967 | Parkison | 138/46 |
| 3,409,050 | 11/1968 | Weese | 138/46 X |
| 3,592,237 | 7/1971 | Borschers | 138/46 X |
| 3,630,455 | 12/1971 | Parkison | 138/45 X |

Primary Examiner—James E. Bryant, III
Assistant Examiner—Daniel P. Stodola
Attorney, Agent, or Firm—Fraser and Bogucki

[57] ABSTRACT

A flow control device is disclosed which includes a housing having a plate or partition oriented generally transverse to the fluid flow direction. The partition has a central opening and a plurality of flow passages disposed in a circular array about the opening. The device also includes a generally T-shaped elastomeric element having a stem received by the central opening in the partition and a disk-shaped flange projecting transversely from the stem. The flange has a lower, beveled, annular surface overlying the flow passages and defining with the partition a variable flow area. Variations in fluid pressure causes the beveled portion of the flange to deflect accordingly. The flow area is thereby varied so that the flow rate is maintained substantially constant irrespective of pressure variations.

9 Claims, 6 Drawing Figures

FLOW CONTROL DEVICE EMPLOYING ELASTOMERIC ELEMENT

FIELD OF THE INVENTION

This invention relates generally to devices for controlling the volumetric flow rate of water in plumbing systems and the like, and more particularly to flow control devices of the kind employing an elastomeric element responsive to system pressure for maintaining a constant, predetermined water flow rate.

BACKGROUND OF THE INVENTION

The prior art includes a variety of constant rate flow controllers employing elastomeric elements that are deformable in proportion to the applied pressure to vary the area of a flow passage. Such devices are found, for example, in faucet spouts, drinking fountains, showerheads, shower arms, automatic washing machines and agricultural drip irrigators and each of these applications may have a relatively broad range of flow rate requirements. The flow rate of a given device depends on a number of factors including the geometry and modulus of elasticity of the elastomeric element and the geometry of the members cooperating with the elastomeric element. Thus, in many prior art devices the properties of the elastomeric element and of the cooperating members must be tailored to provide a particular flow rate. This results in increased manufacturing costs due to the need, for example, for a multiplicity of mold cavities of different geometries.

As dwelling construction and plumbing materials become lighter, an emerging problem that has not been satisfactorily solved by the prior art is that of excessive noise generated by flow control devices, particularly at high flow rates and pressures. Illustrative of the attempts to meet this problem are U.S. Pat. Nos. 3,630,455 and 3,642,031. The device of U.S. Pat. No. 3,630,455, however, employs an elastomeric flow disk having projections that are in frictional engagement with a perforated plate. As a result, these projections tend to wear rapidly thereby altering the flow rate of the device. The insertion of a noise-reducing fibrous plug in the flow path, as suggested in U.S. Pat. No. 3,642,031, causes clogging as well as eventual hardening of the plug caused by interaction with the minerals carried by the water.

Moreover, many flow control devices of the prior art tend to be complex and costly. In some cases, as illustrated by U.S. Pat. No. 2,878,836 (Binks), the flow control element comprises a multiple-part structure that must be assembled before incorporation into the housing of the flow control device. High material cost is also a factor in those devices employing relatively large elastomeric elements.

Furthermore, many of the flow control devices of the prior art cannot be used in conjunction with laminar stream devices (such as that disclosed in U.S. Pat. No. 4,119,276 (Nelson)) because the characteristics of the water flow discharged from the flow control device is not compatible therewith.

In view of the foregoing, an overall object of the present invention is to provide an improved flow control device of the type incorporating an elastomeric element and which is capable of accurately controlling flow rates in a variety of plumbing system environments.

Another object of the invention is to provide a flow control device in which a single elastomeric element of preselected geometric and material properties that cooperates with a member having a single basic design may be used to provide a broad range of flow rates.

Still another object of the invention is to provide a flow control device that is extremely quiet in operation across a wide range of pressures and flow rates.

A further object of the invention is the provision of a flow control device that is simple, economical and easy to maintain.

Yet another object of the invention is to provide a flow control device employing an elastomeric element that is not subject to wear and therefore has a long life.

A still further object of the invention is to provide an improved flow control device that is compatible with the production of a laminar stream from a faucet spout.

SUMMARY OF THE INVENTION

A flow control device in accordance with a specific example of the invention includes a housing having a plate or partition incorporating a plurality of flow passages. An elastomeric control element, operatively associated with the partition, has a projecting portion or flange member spaced apart from the plate and overlying the flow passages. The flange member and the plate thereby define between them a variable flow area. Water traversing the flow control device is compelled to flow around the flange member and through the flow passages via the variable flow area. Increasing upstream pressure causes the flange member to deflect or bend toward the plate to progressively constrict the variable flow area. The flow rate is thereby accurately maintained at a predetermined level. Furthermore, the elastomeric control element forming part of the invention has universal application in that a single element having preselected geometric and material properties can provide accurate control across a wide range of flow rates. Flow rates can be predetermined simply by selecting the size and number of flow passages formed in the partition. A single, basic housing configuration can therefore be used requiring only one injection mold design. To select a given flow rate the only change needed is in the number and size of the mold pins that define the flow passages in the partition. Manufacturing costs are thereby minimized. Also, because the active portions of the elastomeric element do not, for the most part, come in contact with the associated partition, the element is not subject to rapid wear or deterioration. Additionally, the flow pattern about the element is such that the device operates very quietly irrespective of operating pressures and flow rates.

BRIEF DESCRIPTION OF THE DRAWINGS

A better understanding of the invention, as well as further objects and advantages thereof, may be had from a consideration of the following detailed description taken in conjunction with the accompanying drawings in which.

DETAILED DESCRIPTION

Figure 1:
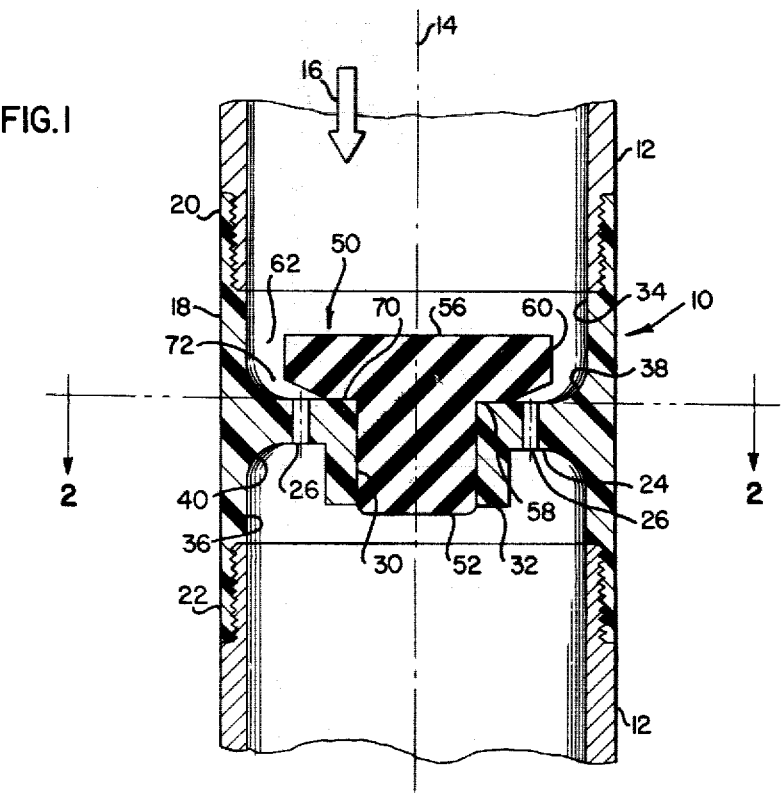
FIG. 1 is a longitudinal, cross-sectional view of a conduit incorporating a flow control device according to the invention.

Referring first to FIGS. 1–4, a flow control device 10 in accordance with one example of the invention is shown installed in a water pipe or conduit 12 having a longitudinal axis 14. The conduit 12 carries water flowing in the direction indicated by the arrow 16.

The flow control device 10 includes a generally tubular housing 18 having end portions 20 and 22 threadedly secured to the conduit 12. The housing may be fabricated of an injection-molded polymeric material such as "Delrin;" a thermoplastic acetal resin available from E. I. duPont de Nemours & Co.

Figure 2:
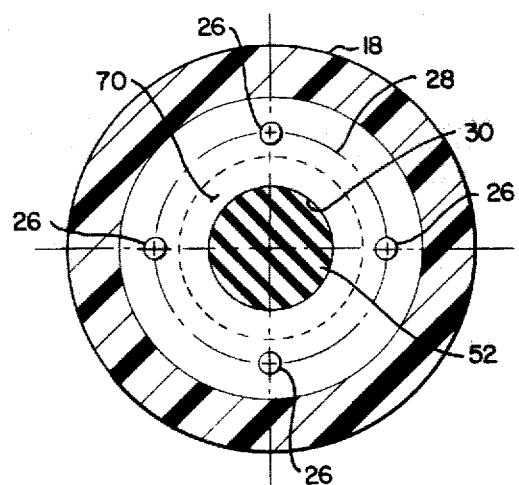
FIG. 2 is a transverse, cross-sectional view of the apparatus shown in FIG. 1 as seen along the plane 2—2.

The housing 18 has a plate or partition 24 disposed transverse to the axis 14 and including a plurality of flow passages 26. As shown in FIG. 2, the specific embodiment under consideration has four equally spaced flow passages 26 lying on a circle 28 centered on the axis 14. One of the important attributes of the present invention is that the flow rate through the control device 10 may be predetermined across a broad range of flow rates merely by varying the number and size of the flow passages 26 that are formed in the partition 24 as part of the manufacturing process. The partition 24 also has a central opening 30, a portion of which is defined by a depending tubular extension 32.

The housing 18 has upper and lower inner, cylindrical sides 34 and 36, respectively, that are faired smoothly into the partition 24 by means of radiused corners 38 and 40. (The terms "upper" and "lower" are used herein for convenience to describe relative positions as they appear in the drawings. In actual use, of course, the flow control device 10 may be oriented in any direction.)

Figure 3:
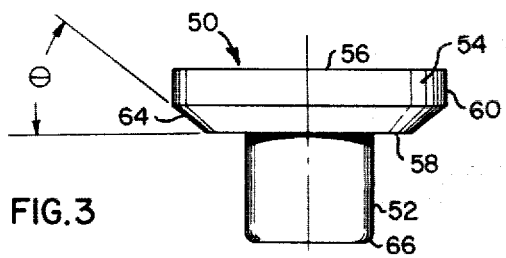
FIG. 3 is a side elevation view of an elastomeric control element in accordance with the invention.
Figure 4:
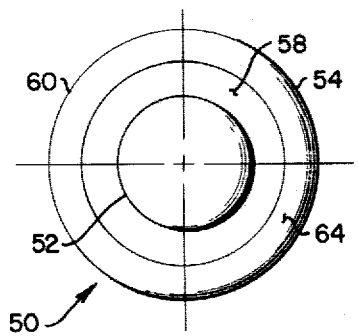
FIG. 4 is a bottom view of the element of FIG. 3.

An elastomeric flow control element 50, which may be fabricated of ethylene propylene rubber (EPR) of suitable durometer hardness, is carried by the partition 24. As best shown in FIGS. 1 and 3, the element 50 has a generally T-shaped configuration in side elevation. Thus, it has a cylindrical stem 52 that fits snugly in the central opening 30 of the partition 24, and a flange 54 projecting laterally from the upper part of the stem 52. Describing the geometry of the elastomeric element in greater detail, it has a top surface 56 that is essentially flat in the normal, inactive state of the element 50 and oriented generally perpendicular to the direction of incoming water. The laterally projecting flange 54 includes a flat, annular, lower bearing surface 58 parallel to the top surface 56 and disposed immediately adjacent the stem 52. The flange 54 also has an outer cylindrical surface 60 whose diameter is somewhat smaller than that of the cylindrical side wall 34 so as to define an annular passageway 62. A sloping or beveled surface 64 in confronting relationship with the partition 24 extends at an angle $\theta$ (FIG. 3) between the annular bearing surface 58 and the cylindrical outer surface 60. The lower end of the stem 52 has a radiused corner 66 to facilitate insertion of the element 50 into the opening 30.

The bearing surface 58 of the element 50 engages a corresponding annular surface or seat 70 on the partition 24, the annular seat 70 circumscribing the central opening 30 and lying just inside the circle 28 along which the flow passages 26 are located. The result is that the beveled surface 64 overlies the flow passages 26 so that in order to traverse the flow control device 10, water must flow around the flange 54 via the annular passageway 62 and then turn inwardly, passing between the beveled surface 64 and the partition 24 before entering the flow passages 26. The beveled portion of the flange 54 and the partition 24 define between them a variable flow area designated generally by the reference numeral 72.

In the operation of the device described thus far, most of the water in conduit 12 impinges against the top planar surface 56 of the elastomeric element 50 and is forced to flow outward along this surface. In the annular passageway 62, this water is turned downwardly, partly by the action of water entering directly into the passageway 62 along flow lines around the outside of the element. From the passageway 62 the water is smoothly turned inwardly, that is, toward the axis 14, through the variable flow area 72 and then discharged through the flow passages 26. Thus, the water is subjected to at least several direction changes and this, coupled with the mixing of the incoming water in passageway 62, as described above, and the smooth transition of flow from the axial to the radially inward direction afforded by the radiused corner 38, is believed to contribute substantially to the suppression of noise. As the pressure across the device 10 increases, the beveled portion of the flange 54 progressively deflects or bends toward the partition 24 so as to increasingly constrict the variable flow area 72 thereby holding the flow rate at a predetermined level. The invention permits identical elastomeric elements, that is, elements having the same selected geometric and material properties, to be used to obtain a wide range of flow rates. The only variables that need to be changed to obtain flows ranging, for example, from as low as about ¼ gallon per minute (gpm) to as high as about 5 gpm are the number and size of the flow passages 26. The same basic housing design may thus be used requiring only one injection mold design. The only mold changes that need to be made are in the number and size of the pins that define the flow passages and those skilled in the art will recognize that such changes can be made quickly and easily. The elastomeric element of the present invention retains its flow controlling properties and accuracy over long periods of use and is extremely durable because, among other things, it is not in frictional, wearing engagement with any associated parts. In addition, the device is easily cleaned thereby minimizing maintenance costs.

In accordance with one practical example, a flow control device according to the invention may have the following characteristics:

| Elastomeric element 50 | |
|---|---|
| Overall height | .290 in. (7.37 mm) |
| Flange diameter | .438 in. (11.13 mm) |
| Flange height | .094 in. (2.39 mm) |
| Stem diameter | .210 in. (5.33 mm) |
| Bevel angle ($\theta$, in FIG. 3) | 28° |
| Material | EPR |
| Durometer hardness | 60 |
| Housing 18 and Partition 24 | |
| Inner side wall diameter | .562 in. (14.27 mm) |
| Number of flow passages | 4 |
| Flow passage diameter | .031 in. (0.79 mm) |
| Flow passage circle (28) diameter | .368 in. (9.35 mm) |

It should be understood that the foregoing specific dimensions, material properties, and so forth, are exemplary only and are not intended to limit the scope of the invention.

Figure 5:
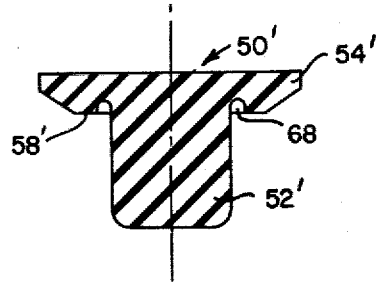
FIG. 5 is a side elevation view, in cross-section, of an elastomeric control element in accordance with another embodiment of the invention.

FIG. 5 shows an alternative embodiment 50' of the elastomeric element. This embodiment is designed to respond rapidly to pressure changes and is particularly useful in applications, such as trajectory drinking fountains, in which a stabilized, rate-controlled stream must be quickly established. The element 50' is in all respects the same as the element 50 previously described except that it has a flange 54' having a smaller overall height and a small annular groove 68 formed in the lower surface 58' immediately adjacent the stem 52'. Thus, both the mass of the flange and its resistance to deflection are reduced resulting in a decrease in response time.

This completes the principal description of the structure and operation of the flow control device that is the subject of the present invention. It will be evident to those skilled in the art that with suitable modifications to accommodate specific installations, the device can be employed in a wide variety of water supply systems.

Figure 6:
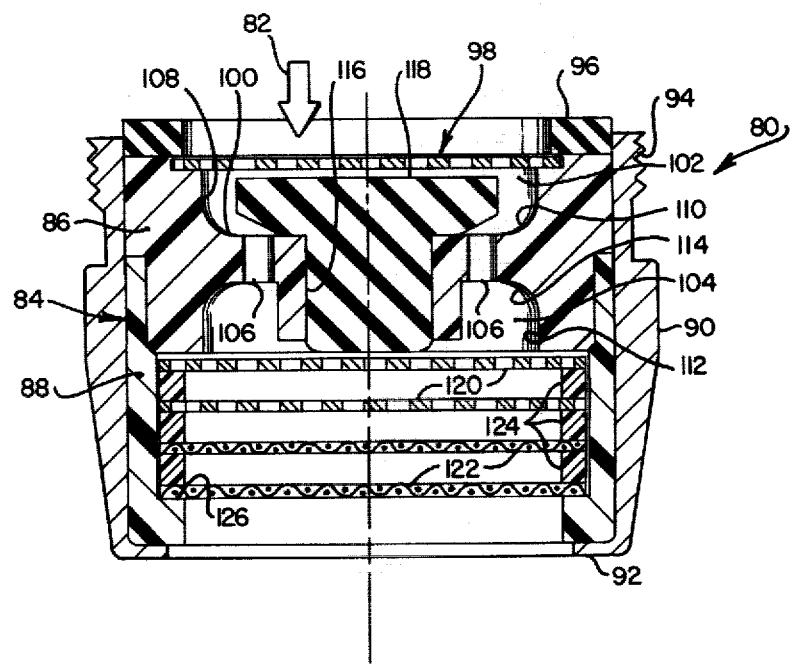
FIG. 6 is a side elevation view, in cross-section, of a faucet spout attachment incorporating a flow control device in accordance with the invention.

Referring now to FIG. 6, the flow control device of the invention is shown, by way of another example, forming a part of a faucet spout attachment 80 through which water flows in the direction indicated by the arrow 82. The attachment includes a generally cylindrical, 2-part housing 84 consisting of an upper section 86 detachably coupled to a lower section 88. The housing sections 86 and 88 may be injection-molded parts made of a material such as "Delrin."

The housing 84 is enclosed within an outer metal shell 90 having an inwardly projecting lower lip 92 for supporting the housing 84, and an upper, externally threaded portion 94 for securing the attachment 80 to a faucet spout either directly or by means of an appropriate threaded adapter. A rubber washer 96 disposed on top of the housing insures a watertight seal between the attachment 80 and the faucet spout. A perforated plate 98 serving as a particle filter is retained by the upper housing section 86 just below washer 96. The plate 98 does not function as a flow conditioning means but only as a filter and may be omitted if desired.

The upper housing section 86 includes a plate or partition 100 that divides the interior of housing section 86 into two chambers—an upper chamber 102 and a lower chamber 104. These chambers are connected by a plurality of flow passages 106 formed in the partition 100. The upper chamber 102 has a cylindrical side wall 108 that is faired smoothly into the partition 100 by means of a radiused corner 110. Likewise, the lower chamber 104 has a cylindrical side wall 112 whose junction with the partition 100 is similarly radiused as indicated by the reference numeral 114. In the particular example shown, the cylindrical side walls 108 and 112 have the same diameter, although this need not be the case. The partition 100 also has a central opening 116 retaining an elastomeric flow control element 118 in all respects similar to the element 50 of FIGS. 1–4. Thus, it will be evident that the operating principle of the flow control device of FIG. 6 is the same as that already described.

The lower housing section 88 contains a flow conditioning means that, in the example shown in FIG. 6, is in the form of a laminar stream device that includes a pair of perforated plates 120 and a pair of screens 122, the plates and screens being arranged in a stack and separated by three identical ring spacers 124. The plate and screen stack is supported by a peripheral ledge 126 defined by an inwardly directed flange at the discharge end of the lower housing 88. The specific geometry of the plates and the screens and the spacings therebetween need not be discussed here. A complete description of a device for producing a laminar stream is contained in U.S. Pat. No. 4,119,276, issued Oct. 10, 1978 and entitled "Laminar Stream Spout Attachment." An advantage of the flow control device of the present invention is that the characteristics of the water flow discharged therefrom are compatible with the production of a laminar stream. It will be obvious to those skilled in the art, however, that other flow conditioning means, such as aerators, can be utilized in conjunction with the flow control device of the present invention in lieu of the laminar stream device that is specifically shown.

What is claimed is:

1. A flow control device for a fluid flow conduit, said device including a cylindrical housing having a chamber defined by a cylindrical side wall and a transverse plate, said plate having a flat surface facing said chamber and a plurality of flow passages arranged in a circle; and an elastomeric element having a circular flange disposed within said chamber, said flange having a seat engaging the flat surface of said plate and a beveled surface in confronting relationship with the flat surface of said plate and being progressively spaced apart therefrom, said beveled surface overlying said flow passages, said beveled surface and said plate defining between them a variable flow area, said plate including a central opening and said elastomeric element being generally T-shaped and including a stem received by said opening, said flange projecting from said stem.

2. A flow control device, as defined in claim 1, in which said flange has an upper planar surface, an outer cylindrical surface of diameter smaller than that of the chamber side wall and an annular, lower surface extending about said stem and disposed parallel to said upper surface, said lower, annular surface being seated against a corresponding annular portion of the flat surface on the plate about said central opening, said beveled surface connecting said lower surface and said outer cylindrical surface.

3. A flow control device, as defined in claim 2, in which said annular, lower surface includes an annular groove whereby the response time of said device is reduced.

4. A flow control device, as defined in claim 1, in which said chamber side wall fairs smoothly into said flat surface of said plate.

5. A flow control device comprising:
a cylindrical housing having an upstream chamber defined in part by a cylindrical side wall, a downstream chamber, and a partition separating said chambers, said partition having a flat upper surface, a central opening and a plurality of flow passages arranged in a circle about said opening, said flow passages providing fluid communication between said chambers; and
a generally T-shaped elastomeric element including a cylindrical stem received by said opening in said partition and a disk-shaped flange projecting laterally from said stem and disposed within the upstream chamber, said flange having an upper planar surface, an outer cylindrical surface having a diameter smaller than that of the upstream chamber side wall, an annular, lower surface extending about said stem and lying parallel to said upper surface, said lower annular surface being seated against a corresponding annular surface on the partition about said central opening, and a beveled surface connecting said lower surface and said outer cylindrical surface, said beveled surface overlying said flow passages.

6. A flow control device, as defined in claim 5, in which said cylindrical wall is faired smoothly into said partition.

7. A flow control device, as defined in claim 5, in which said annular, lower surface includes an annular groove, whereby the response time of said device is reduced.

8. A flow control device comprising:
a cylindrical housing having an upstream chamber defined in part by a cylindrical side wall, a downstream chamber, and a transverse partition separating said chambers, said partition having a flat upper surface, a central opening and a plurality of flow passages arranged in a circle about said opening, said cylindrical side wall being radiused smoothly into said upper surface of said partition, said flow passages providing fluid communication between said chambers; and
a generally T-shaped elastomeric element including a cylindrical stem received by said opening in said partition and a beveled flange projecting laterally from said stem and disposed within the upstream chamber, said flange having
an upper planar surface;
an outer cylindrical surface having a diameter smaller than that of the upstream chamber side wall to define an annular passageway about said outer cylindrical surface;
an annular, lower, transverse surface extending about said stem parallel to said upper surface, said lower transverse surface being seated against a corresponding annular portion of the upper surface of the partition about said central opening; and
a beveled surface connecting said lower surface and said outer cylindrical surface,
said beveled surface overlying said flow passages, the beveled surface and the flat upper surface of the partition defining between them a variable flow area opening outwardly toward said cylindrical side wall whereby flow is guided smoothly from said annular passageway into said variable flow area and through said flow passages, variations in fluid pressure causing said flange to deflect accordingly to vary said flow area to maintain the flow rate through the device substantially constant irrespective of pressure variations.

9. A flow control device, as defined in claim 8, in which said annular, lower surface includes an annular groove, whereby the response time of said device is reduced.

* * * * *